United States Patent Office 3,736,319
Patented May 29, 1973

3,736,319
NOVEL CYCLOPENTANONE-2-CARBOXYLATES
Jacques Martel, Bondy, and Edmond Toromanoff, Paris, France, assignors to Roussel-UCLAF, Paris, France
No Drawing. Filed Apr. 28, 1971, Ser. No. 138,274
Claims priority, application France, Apr. 30, 1970, 15,908
Int. Cl. C07d 7/04
U.S. Cl. 260—240 R
7 Claims

ABSTRACT OF THE DISCLOSURE

Novel alkyl 3-(3' - OR - trans 1'-alkenyl)-cyclopentanone-2-carboxylates of the formula

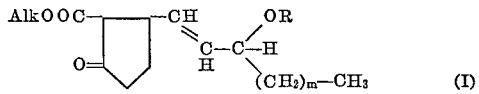
(I)

wherein Alk is alkyl of 1 to 7 carbon atoms, R is selected from the group consisting of hydrogen, acyl of an organic carboxylic acid of 1 to 18 carbon atoms and α-tetrahydropyranyl and $m$ is 3, 4 or 5 which are intermediates for prostaglandins and their preparation and novel intermediates.

OBJECTS OF THE INVENTION

It is an object of the invention to provide novel alkyl 3-(3'-OR-trans 1'-alkenyl)-cyclopentanone-2-carboxylates of Formula I.

It is another object of the invention to provide a novel process for the preparation of the esters of Formula I.

It is a further object of the invention to provide novel intermediates for the esters of Formula I.

These and other objects and advantages of the invention will become obvious from the following detailed description.

THE INVENTION

The novel products of the invention are alkyl 3-(3'-OR-trans-1'-alkenyl) - cyclopentanone - 2 - carboxylates of the formula

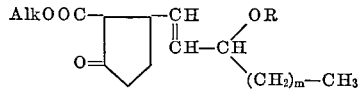

wherein Alk is alkyl of 1 to 7 carbon atoms, R is selected from the group consisting of hydrogen, acyl of an organic carboxylic acid of 1 to 18 carbon atoms and α-tetrahydropyranyl and m is 3, 4 or 5. Particularly advantageous products are ethyl 3-(3'-α-tetrahydropyranyloxy-trans 1'-octenyl)-cyclopentanone-2-carboxylate and ethyl 3-(3'-hydroxy - trans-1'-octenyl)-cyclopentanone-2-carboxylate.

The novel process for the preparation of the novel esters of Formula I comprises reacting propargylacetic acid or a derivative thereof with a precursor agent for alkyl acetate to form alkyl 3-oxo-6-heptynoate of the formula $$HC\equiv C-(CH_2)_2-CO-CH_2-COOAlk \quad (II)$$

wherein Alk is alkyl of 1 to 7 carbon atoms, reacting the latter with an etherification agent to form alkyl 3-alkoxy-6-yne-2-heptenoate of the formula

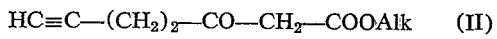
(III)

wherein Alk' is alkyl of 1 to 7 carbon atoms, condensing the latter in the form of a metallic salt with an α-halo-alkanal of the formula

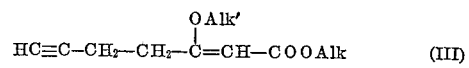
(IV)

wherein Hal is bromine or chlorine and $m$ is 3, 4 or 5 to form an alkyl 3-alkoxy-8-hydroxy-9-halo-6-yne-2-alkenoate of the formula

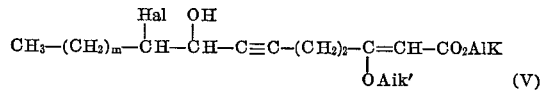
(V)

hydrolyzing the latter with an acid agent to form alkyl 3-oxo-8-hydroxy-9-halo-6-alkynoate of the formula

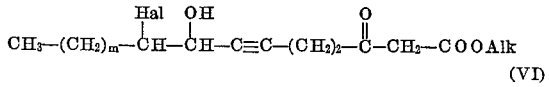
(VI)

hydrogenating the latter in the presence of a partially deactivated metallic catalyst to form alkyl 3-oxo-8-hydroxy-9-halo-cis 6-alkenoate of the formula

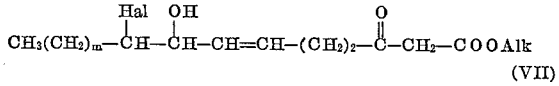
(VII)

reacting the latter with an alkali metal alcoholate to form a trans epoxy-cis alkene of the formula

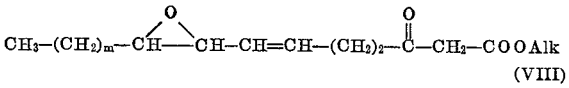
(VIII)

reacting the latter with a secondary amine to form the corresponding enamine which is cyclized in the presence of a basic agent to form alkyl 3-(3'-hydroxy-trans 1'-alkenyl)-cyclopentanone-2-carboxylate of the formula

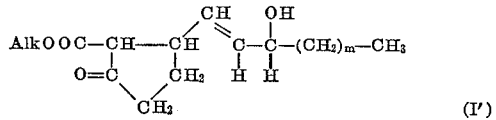
(I')

and if desired reacting the latter with an acylating agent or an etherification agent to obtain the corresponding compound of Formula I wherein R is α-tetrahydropyranyl or acyl of an organic carboxylic acid of 1 to 18 carbon atoms.

The cyclization in the presence of a basic agent is effected by intramolecular displacement $SN_2'$ of the ethylenic epoxy chain with an anion to confer stereospecific configuration of the natural products at the future 12 and 15 centers of prostaglandins. This reaction allows to resolve one of the principle difficulties in stereospecific synthesis of compounds of the type of Formula I.

In the condensation of the alkyl 3-alkoxy-6-yne-2-heptenoate of Formula III with α-halo alkanal of Formula IV to form the compound of Formula V, it is remarkable that the ethynyl group present is compatible with the reaction conditions necessary to effect the condensation without secondary intramolecular or intermolecular reactions. It is very important to note that it is possible by this condensation to produce an ethylenic compound which ultimately leads by cis hydrogenation to the desired vinyl compound of Formula VII.

In a preferred embodiment of the process, propargyl acetyl imidazole (prepared by reacting propargyl acetic acid and N,N'-thionyl-diimidazole) is treated with magnesium enolate of alkyl malonate such as ethyl malonate to form the alkyl 3-oxo-6-heptynoate of Formula II, etherifying the latter with an alkyl orthoformate in the presence of a strong acid such as sulfuric acid or p-toluene sulfonic acid to form the corresponding compound of Formula III, reacting the latter in the form of a metallic salt such as lithium salt produced by reaction of an alkyl lithium such as butyl lithium in an ether-tetrahydrofuran media with the α-halo alkanal in the same media to form a compound of Formula V, subjecting the latter to hydrolysis with a mineral acid such as sulfuric acid or hydrochloric acid to form a compound of Formula VI, hydrogenating the latter in the presence of palladium on a classic support such as barium sulfate, the catalyst being partially deactivated by the addition of lead acetate, of pyridine, of quinoline or a mixture of two of said compounds.

The epoxide is formed by treating a compound of Formula VII with an alkali metal alcoholate such as sodium or potassium methylate, ethylate, tert.-amylate and tert.-butylate. The reaction is effected in an anhydrous media, preferably in the alcohol corresponding to alkali metal alcoholate used. The secondary amine to form the enamine of alkyl 3-oxo-trans 8,9-epoxy-cis alkenoate is selected from the group of cyclic amines such as pyrrolidine, piperidine and morpholine.

The basic agent for the cyclization may be an alkali metal amide such as sodium amide and the reaction is effected in an anhydrous organic solvent such as tetrahydrofuran.

The reaction of a compound of Formula I' to form the corresponding α-tetrahydropyranyloxy compound is effected with dihydropyran in the presence of a mineral or organic acid such as sulfuric acid or p-toluenesulfonic acid. To form the corresponding acyloxy derivative, the compound of Formula I' is reacted with an acylating derivative of the organic carboxylic acid of 1 to 18 carbon atoms such as the acid chloride or anhydride in the presence of a basic agent such as pyridine, triethylamine or alkalimetal hydroxide.

Suitable organic acids of 1 to 18 carbon atoms may be derived from an aliphatic, aromatic, cycloaliphatic or heterocyclic carboxylic acid.

The compounds of Formula I are useful intermediates for the preparation of compounds of the prostaglandin family which have known pharmaceutical properties. The compounds can be reacted as described in copending, commonly assigned U.S. application Ser. No. 138,276, filed on even date herewith by reacting the α-tetrahydropyranyloxy compound of Formula I in the presence of a basic agent with an alkyl haloalkeneoate of the formula

wherein Hal is bromine or chlorine and Alk'' is alkyl of 1 to 7 carbon atoms to obtain an alkyl carbalkoxyprostadieneoate of the formula

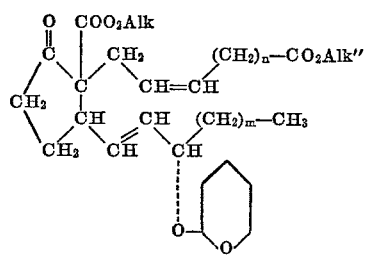

treating the latter with an alkali metal alcoholate to obtain a compound of the formula

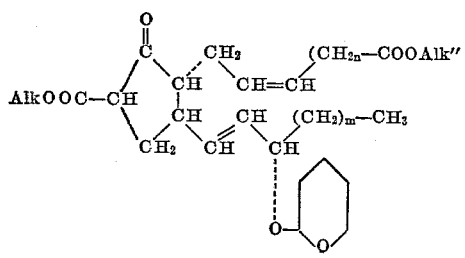
(XI)

saponifying the latter with a basic agent to form a compound of the formula

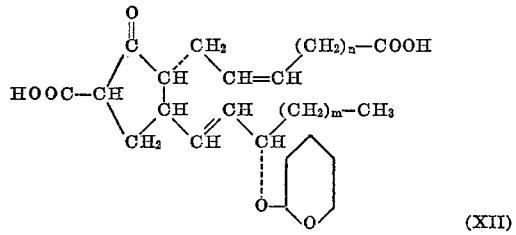
(XII)

which can be heated to form a prostadienic acid of the formula

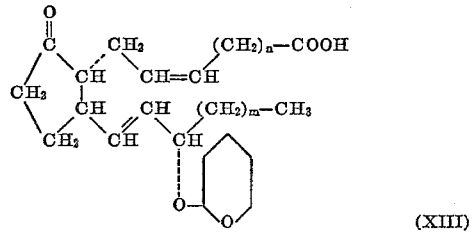
(XIII)

which is hydrolyzed in an acid media to obtain a prostanoic acid derivative of the formula

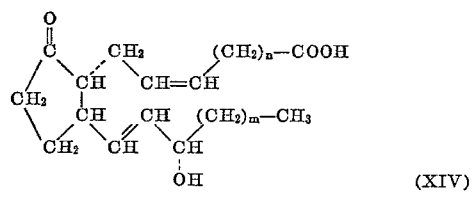
(XIV)

The alkyl haloalkeneoates of Formula IX may be prepared as described in copending, commonly assigned U.S. patent application Ser. No. 138,275 filed on even date herewith, which comprises condensing a bromohaloalkane of the formula $$Br-(CH_2)_n-Hal'$$ (XV)

wherein Hal' is bromine or chlorine and $n$ is 2, 3 or 4 with tetrahydropyranyl ether of propargyl alcohol in the presence of an alkali metal in liquid ammonia to form (α-tetrahydropyranyloxy) haloalkyne of the formula

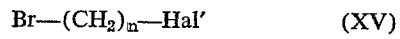
(XVI)

reacting the latter with an alkali metal cyanide followed by hydrolysis in a basic media to obtain (α-tetrahydropyranyloxy) alkynoic acid of the formula

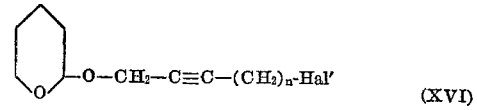
(XVII)

reacting the latter with an esterification agent derived from a lower alkanol, to form the corresponding ester of the acid of Formula XVII, hydrolyzing the said ester in an acid media to remove the α-tetrahydropyranyl group and hydrogenating the resulting alkyl hydroxyalkyneoate in the presence of a partially deactivated catalyst to obtain a compound of the formula $$HO-CH_2-CH=CH-(CH_2)_n-COOAlk''$$

reacting the latter with a halogenating agent to obtain the corresponding alkyl haloalkeneoate of Formula IX.

The α-halo alkanals of Formula IV may be prepared by a process analogous to that described by Krattiger (Bull. Soc. Chim., 1953, p. 222) which comprises reacting the desired halogen with the corresponding alkanal in an aqueous and strongly hydrohalic solution.

In the following examples there are described several preferred embodiments to illustrate the invention. However, it should be understood that the invention is not intended to be limited to the specific embodiments.

EXAMPLE I

Preparation of ethyl 3-(3'-α-tetrahydropyranyloxy trans-1'-octenyl)-cyclopentanone-2-carboxylate Step A: Ethyl 3-oxo-6-heptyneoate.—7.3 g. of ethyl malonate (Bram et al., Bull. Soc. Chim., 1964, p. 945) were dissolved under a nitrogen atmosphere in 50 cc. of tetrahydrofuran and then 0.10 mol of isopropyl magnesium bromide in solution in tetrahydrofuran was added. The mixture was heated slightly and allowed to return to room temperature while maintaining the nitrogen atmosphere to form solution A.

15 g. of imidazole were dissolved in 100 cc. of tetrahydrofuran and a solution of 6 g. of thionyl chloride in 30 cc. of tetrahydrofuran was added thereto. After stirring for 15 minutes, the mixture was filtered and the filter was washed with tetrahydrofuran to obtain a solution of N,N'-thionyldimidazole, 5 g. of propargylacetic acid dissolved in 50 cc. of tetrahydrofuran was added to the said solution and the mixture was stirred for 15 minutes at room temperature to obtain a solution of propargylacetylimidazole which was used as is.

Solution A was added to the solution of propargylacetylimidazole and the mixture was stirred overnight at room temperature. The mixture was acidified by addition of 4% hydrochloric acid and was extracted with ether. The ether phase was washed with an aqueous sodium bicarbonate solution, dried, treated with activated carbon, filtered and evaporated to dryness. The residue was passed through alumina with elution with methylene chloride to obtain 6.03 g. of ethyl 3-oxo-6-heptynoate which was used as is for the next step.

The product occurred in the form of pale yellow prisms melting at 25° C. and soluble in alcohols, ether, benzene and chloroform and insoluble in water.

As far as is known, this compound is not described in the literature.

Step B: Ethyl 3-ethoxy-6-yne-2-heptenoate.—30 cc. of ethyl orthoformate and 0.35 cc. of concentrated sulfuric acid were added to a solution of 10 g. of ethyl 3-oxo-6-heptynoate in 60 cc. of ethanol and 25 cc. of solvent were distilled off in 45 minutes while bubbling nitrogen therethrough. After cooling the mixture, methylene chloride was added thereto and the mixture was washed with 2 N sodium hydroxide. The mixture was extracted with methylene chloride and the organic phases were dried over sodium sulfate, treated with activated carbon, filtered and evaporated to dryness under reduced pressure. The residue was chromatographed over silica gel and elution with methylene chloride to obtain 7.05 g. of ethyl 3-ethoxy-6-yne-2-heptenoate. The product occurred in the form of a pale yellow liquid soluble in alcohols, ether, benzene and chloroform and insoluble in water.

As far as is known, this compound is not described in the literature.

Step C: Ethyl 3-ethoxy-8-hydroxy-9-chloro-6-yne-2-tetradecenoate.—9.25 cc. of an ether solution of 1.085 N butyllithium were added to a mixture of 2 g. of ethyl 3-ethoxy-6-yne-2-heptenoate and 15 cc. of tetrahydrofuran cooled to —25° C. and the mixture was left standing at —25° C. for 1½ hours. After cooling the mixture to —30° C., 3 g. of α-chloroheptanal (process of Krattiger, Bull. Soc. Chim., 1953, p. 222) were added thereto and the mixture stood for 30 minutes at —20° C., at 0° C. for 30 minutes and then returned to room temperature. The reaction mixture was added to an iced aqueous solution of monosodium phosphate and was extracted with ether. The organic phase was washed with aqueous sodium bicarbonate solution, then water and finally with aqueous sodium chloride solution. The solution was dried over sodium sulfate, treated with activated carbon, filtered and evaporated to dryness. The residue was chromatographed over silica gel with elution with methylene chloride containing 0.5% of acetone. The residue was purified by another chromatography over silica gel with elution with methylene chloride containing 0.25% of acetone and then 0.5% acetone to obtain 1.85 g. of ethyl 3-ethoxy-8-hydroxy-9-chloro-6-yne-2-tetradecenoate in the form of an amorphous pale yellow product soluble in alcohols and ether and insoluble in water.

Analysis.—$C_{18}H_{29}O_4Cl$; molecular weight=344.87. Calculated percent: Cl, 10.28. Found (percent): 10.3.

U.V. spectrum (ethanol):

Max. at 237 m$\mu$ $E_{1\ cm.}^{1\%}$=357

As far as is known, this product is not described in the literature.

Step D: Ethyl 3-oxo-8-hydroxy-9-chloro-6-tetradecynoate.—A mixture of 6.95 g. of ethyl 3-ethoxy-8-hydroxy-9-chloro-6-yne-2-tetradecenoate, 70 cc. of ethanol and 35 cc. of 2 N hydrochloric acid was heated with stirring under a nitrogen atmosphere at 50° C. for 1½ hours, and after cooling, water was added to the reaction mixture which was extracted with methylene chloride. The organic phase was washed with an aqueous sodium bicarbonate solution and then water until the wash waters were neutral, dried over sodium sulfate, filtered and evaporated to dryness under reduced pressure to obtain 6 g. of raw ethyl 3-oxo-8-hydroxy-9-chloro-6-tetradecynoate. The product was purified by chromatography over silica gel and elution with a 70-30 mixture of cyclohexane-ethyl acetate to obtain pale yellow crystals soluble in alcohols and ether and insoluble in water.

Analysis.—$C_{16}H_{25}O_4Cl$; molecular weight=316.82. Calculated percent: Cl, 11.2. Found (percent): 11.4.

UV spectra:

Ethanol max. at 244 m$\mu$ $E_{1\ cm.}^{1\%}$=34 infl. towards 279 m$\mu$ $E_{1\ cm.}^{1\%}$=6

Ethanol—0.1 N NaOH

Max. at 275 m$\mu$ $E_{1\ cm.}^{1\%}$=668

As far as is known, this product is not described in the literature.

Step E: Ethyl 3-oxo-8-hydroxy-9-chloro-cis-6-tetradecenoate.—240 mg. of 5% palladium on barium surfate were added to 15 cc. of ethylacetate and a current of hydrogen was passed therethrough for 30 minutes. After absorption of 6 cc. of hydrogen, a solution of 3.03 g. of ethyl 3-oxo-8-hydroxy-9-chloro-6-tetradecynoate in 5 cc. of ethyl acetate containing 0.3 cc. of quinoline was added thereto and was washed with 10 cc. of ethyl acetate. The current of hydrogen was passed through the mixture for 2 hours and after absorption of 223 cc. of hydrogen, the mixture was filtered. The filter was washed with ethyl acetate and the organic phase was washed with 0.5 N hydrochloric acid, then with water and was dried over sodium sulfate, treated with activated carbon and filtered. The filtrate was evaporated to dryness under reduced pressure to obtain 3 g. of ethyl 3-oxo-8-hydroxy-9-chloro-cis-6-tetradecenoate in the form of an amorphous, pale yellow product soluble in alcohols and ether and insoluble in water.

Analysis.—$C_{16}H_{27}O_4Cl$; molecular weight=318.84. Calculated (percent): C, 60.27; H, 8.54; Cl, 11.12. Found (percent): C, 60.0; H, 8.4; Cl, 10.8.

U.V. spectrum (ethanol):

Inflex. towards 226 m$\mu$ $E_{1\ cm.}^{1\%}$=25

Max. at 243 m$\mu$ $E_{1\ cm.}^{1\%}$=32

As far as is known, this compound is not described in the literature.

Step F: Ethyl 3-oxo-trans-8,9-epoxy-cis-6-tetradecenoate.—32 cc. of a solution of 1 N potassium tertiary butylate in tertiary butanol were added under nitrogen to a solution of 5 g. of ethyl 3-oxo-8-hydroxy-9-chloro-cis-6-tetradecenoate in 50 cc. of tertiary butanol and the mixture was stirred for 45 minutes. Methylene chloride was added thereto and the mixture was poured into a saturated aqueous solution of monosodium phosphate. The mixture was extracted with methylene chloride and the organic phase was washed with water, dried over sodium sulfate, treated with activated carbon, filtered and evaporated to dryness under reduced pressure. The residue was chromatographed over silica gel with elution with a 1:1 mixture of cyclohexane and ethyl acetate to obtain 3.4 g. of ethyl 3-oxo-trans-8,9-epoxy-cis 6-tetradecenoate in the form of a pale yellow liquid, soluble in most of the usual organic solvents and insoluble in water.

*Analysis.*—$C_{16}H_{26}O_4$; molecular weight=282.38. Calculated (percent): C, 68.05; H, 9.28. Found (percent): C, 68.3; H, 9.4.

U.V. spectrum (ethanol):

Max. at 246 m$\mu$ $E_{1\,cm.}^{1\%}$=49

As far as is known, this compound is not described in the literature.

Step G: Ethyl 3-N-pyrrolidyl-trans 8,9-epoxy-2-cis 6-tetradecadienoate.

A mixture of 1.5 g. of ethyl 3-oxo-trans 8,9-epoxy-cis 6-tetradecenoate, 15 cc. of benzene, 1.5 cc. of pyrrolidine and 75 mg. of p-toluene sulfonic acid was purged with nitrogen and was then stirred at room temperature for 4 days. At the end of this time, the mixture was evaporated to dryness under reduced pressure and toluene was added to eliminate excess pyrrolidine. The residue was dissolved in methylene chloride and the organic phase was washed with water. The wash waters were re-extracted with methylene chloride and the combined methylene chloride phases were dried over magnesium sulfate, treated with activated carbon, filtered and evaporated to dryness under reduced pressure to obtain 1.9 g. of ethyl 3-N-pyrrolidyl-trans 8,9-epoxy-2-cis 6-tetradecadienoate in the form of dark yellow amorphous solid soluble in alcohols and chloroform and insoluble in water.

*Analysis.*—$C_{20}H_{33}O_3N$; molecular weight=335.47. Calculated (percent): N, 4.17. Found (percent): 4.9.

U.V. spectrum (ethanol):

Inflex. towards 230 m$\mu$ $E_{1\,cm.}^{1\%}$=70

Max. at 289=290 m$\mu$ $E_{1\,cm.}^{1\%}$=740

IR spectrum: Absence of OH and bands at 1671, 1565, 1446 and 1143 cm.$^{-1}$.

As far as is known, this compound is not described in the literature.

Step H: Ethyl 3-(3'-hydroxy-trans 1'-octenyl)-cyclopentanone-2-carboxylate.—4.3 g. of sodium amide were added under nitrogen to 9.3 g. of ethyl 3-n-pyrrolidyl-trans 8,9-epoxy-2 cis 6-tetradecadienoate in 110 cc. of tetrahydrofuran and the mixture was stirred overnight at room temperature. The mixture was poured into an iced aqueous solution of monosodium phosphate and the mixture was extracted with methylene chloride. The organic phase was washed with water, dried over sodium sulfate, treated with activated carbon, filtered and evaporated to dryness under reduced pressure. The residue was chomatographed over silica gel to obtain 3.4 g. of ethyl 3-(3'-hydroxy-trans 1'-octenyl)-cyclopentanone-2 - carboxylate in the form of a yellow liquid soluble in alcohols, ether, benzene and chloroform and insoluble in water.

*Analysis.*—$C_{23}H_{28}O_9N_2$; molecular weight=476.47 (dinitrobenzoate). Calculated (percent): C, 57.98; H, 5.88; N, 5.88. Found (percent): C, 57.8; H, 6.0; N, 6.1.

As far as is known, the compound is not described in the literature.

Step I: Ethyl 3-(3' - $\alpha$ - tetrahydropyranyloxy-trans 1'-octenyl)cyclopentanone-2-carboxylate.—4 crystals of p-toluene sulfonic acid and then 4 cc. of dihydropyran were added to a solution of 3 g. of ethyl 3-(3'-hydroxy-trans 1'-octenyl) cyclopentanone - 2 - carboxylate in 10 cc. of ether cooled to 0° C. and the mixture was allowed to return to room temperature. The mixture was added to anhydrous sodium carbonate and was stirred for 1 hour under nitrogen. After filtration, the solvent and excess dihydropyran was evaporated off under reduced pressure to obtain 3.89 g. of ethyl 3-(3'-$\alpha$-tetrahydropyranyloxy-trans 1'-octenyl)-cyclopentanone - 2 - carboxylate in the form of a colorless liquid soluble in alcohols, ether and chloroform and insoluble in water.

*Analysis.*—$C_{21}H_{34}O_5$; molecular weight=366. Calculated (percent): C, 68.85; H, 9.29. Found (percent): C, 68.9; H, 9.0.

As far as is known, this compound is not described in the literature.

EXAMPLE II

Ethyl 3-ethoxy-6-yne-2-heptenoate

A mixture of 10.1 g. of ethyl 3-oxo-6-heptynoate, 10 cc. of ethanol, 20 cc. of ethyl ortho formate and 1 g. of p-toluene sulfonic acid was refluxed under nitrogen for 80 minutes and after cooling, methylene chloride was added to the mixture which was then poured into 100 cc. of iced N sodium hydroxide. The organic phases were washed with iced N sodium hydroxide and then with an aqueous sodium chloride solution and re-extracted the wash solutions with methylene chloride. The combined organic phases were dried over sodium sulfate, filtered and evaporated to dryness under reduced pressure. The residue was subjected to chromatography over silica gel and elution with methylene chloride to obtain 6.716 g. of ethyl 3-ethoxy-6-yne -2-heptenoate identical to that obtained in Step B of Example I.

EXAMPLE III

Ethyl 3-oxo-8-hydroxy-9-chloro-6-tetradecynoate

A mixture of 6.5 g. of ethyl 3-ethoxy-6-yne-2-heptenoate and 110 cc. of tetrahydrofuran was cooled to −60° C. and then 29 cc. of a solution of 1.6 N butyllithium in hexane was added and then stirred for 3 hours. A solution of 9.7 g. of $\alpha$-chloro-heptanal in 25 cc. of tetrahydrofuran was added thereto and the mixture was stirred for one hour at −60° C. and then was allowed to return to room temperature. The reaction mixture was added to an iced saturated aqueous solution of monosodium phosphate and the mixture was extracted with ether. The ether phase was washed with an aqueous solution saturated of sodium bicarbonate, then with water until the wash waters were neutral, dried over sodium sulfate and evaporated to dryness.

The residue was dissolved in 100 cc. of ethanol and 56.5 cc. of 2 N hydrochloric acid and the mixture was stirred under a nitrogen atmosphere at 50 to 60° C. for 1½ hours. After cooling, the solution was added to a water-ice mixture and was extracted with ether. The ether phase was washed with water until the wash waters were neutral, dried over magnesium sulfate and evaporated to dryness to obtain 16 g. of ethyl 3-oxo-8-hydroxy-9-chloro-6-tetradecynoate.

Volatile products contained in the 16 g. of raw product were removed by distillation under reduced pressure and at the end of the distillation, the residue was cooled and was taken up in ether. The solution was treated with activated carbon, filtered and evaporated to dryness. The residue was dissolved in 5 cc. of isopropyl ether and was added to 4 volumes of petroleum ether with agitation. The solution was cooled to −60° C. and petroleum ether was added until there was formation of a deposit and was decanted.

A mixture of the said deposit in 22 cc. of ethanol and 113 cc. of a saturated cupric acetate solution was stirred overnight and then decanted. The cupric complex formed was washed with water and vacuum filtered. The complex was suspended in petroleum ether and was stirred for 1 hour in an ice-water bath. The mixture was filtered and the filter was washed with iced petroleum ether and then an iced 2-1 mixture of petroleum ether and ether. The precipitate was dissolved in methylene chloride and the solution was acidified with dilute acetic acid and added to methylene chloride. The methylene chloride phase was washed with water, then aqueous sodium bicarbonate solution and then with water until the wash waters were neutral. The solution was dried over magnesium sulfate and evaporated to dryness to obtain ethyl 3 - oxo - 8 - hydroxy-9-chloro - 6 - tetradecynoate identical to that of Step D of Example I.

Various modifications of the process and products of the invention may be made without departing from the spirit or scope thereof and it is to be understood that the invention is to be limited only as defined in the appended claims.

We claim:
1. A 3-(3'-OR-trans 1'-alkenyl)cyclopentanone-2-carboxylate of the formula

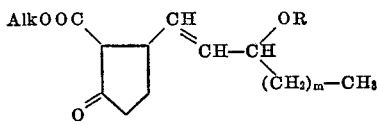

wherein Alk is alkyl of 1 to 7 carbon atoms, R is α-tetrahydropyranyl and $m$ is 3, 4 or 5.

2. The compound of claim 1 wherein Alk is ethyl.

3. A process for the preparation of a compound of claim 1 comprising reacting propargylacetyl imidazole and magnesium enolate of a lower alkyl malonate to form alkyl 3-oxo-6-heptylnoate of the formula $$HC\equiv C(CH_2)_2-CO-CH_2-COOAlk$$

wherein Alk is alkyl of 1 to 7 carbon atoms, reacting the latter with an alkyl orthoformate to form alkyl 3-alkoxy-6-yne-heptenoate of the formula

wherein Alk' is alkyl of 1 to 7 carbon atoms, condensing the latter in the form of an alkali metal salt with an α-haloalkanal of the formula

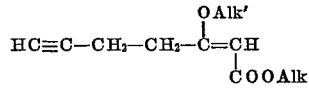

wherein Hal is bromine or chlorine and $m$ is 3, 4 or 5 to form an alkyl 3-alkoxy-8-hydroxy-9-halo-6-yne-2-alkenoate of the formula

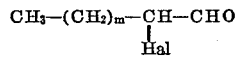

hydrolyzing the latter with an acid agent to form alkyl 3-oxo-8-hydroxy-9-halo-6-alkynoate of the formula

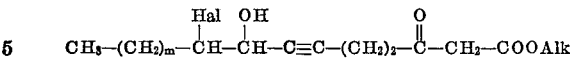

hydrogenating the latter to reduce the triple bond to form alkyl 3-oxo-8-hydroxy-9-halo-cis 6-alkenoate of the formula

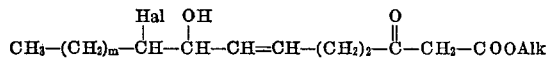

reacting the latter with an alkali metal alcoholate to form a trans epoxy-cis alkene of the formula

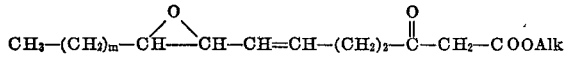

reacting the latter with a secondary amine to form the corresponding enamine which is cyclized in the presence of a basic agent to form alkyl 3-(3'-hydroxy-trans 1'-alkenyl)-cyclopentanone-2-carboxylate of the formula

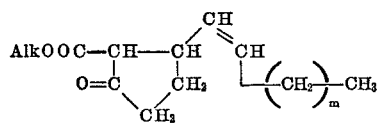

and reacting the latter with dihydropyran in the presence of an acid to obtain the corresponding 3'-α-tetrahydropyranyloxy derivative.

4. The process of claim 3 wherein the hydrogenation is effected in the presence of a palladium catalyst on an inert support partially deactivated by at least one member of the group consisting of lead acetate, pyridine and quinoline.

5. The process of claim 3 wherein the secondary amine is a cyclic amine selected from the group consisting of pyrrolidine, piperidine and morpholine.

6. The process of claim 3 wherein the basic agent for the cyclization is an alkali metal amide.

7. The compound of claim 1 wherein Alk is ethyl and $m$ is 4.

References Cited

Martel et al., Tetrahedron Letters No. 15, pp. 1491 to 1496 (1972).

JOHN D. RANDOLPH, Primary Examiner

U.S. Cl. X.R.

260—345.7, 345.8, 345.9, 348 A, 468 D, 484 R, 514 D